United States Patent [19]

Yu

[11] Patent Number: 5,190,258
[45] Date of Patent: Mar. 2, 1993

[54] ARTICULATED SUPPORT ASSEMBLY

[76] Inventor: Chung C. Yu, 87 Townsend St., Walton, N.Y. 13856

[21] Appl. No.: 887,881

[22] Filed: May 26, 1992

[51] Int. Cl.$^5$ .............................................. E04G 3/00
[52] U.S. Cl. ..................................... 248/279; 248/918
[58] Field of Search ............... 248/279, 278, 918, 282, 248/283, 285, 286, 287, 298; 312/280; 108/26

[56] References Cited

U.S. PATENT DOCUMENTS

| | | | |
|---|---|---|---|
| 1,027,479 | 5/1912 | Hoffine | 108/26 |
| 1,284,596 | 11/1918 | Civitillo | 248/285 X |
| 2,754,167 | 7/1956 | Young | 108/26 X |
| 3,827,686 | 8/1974 | Storkh | 248/286 X |
| 5,035,392 | 7/1991 | Gross | 248/918 X |
| 5,082,235 | 1/1992 | Crowther | 248/918 |

Primary Examiner—J. Franklin Foss
Attorney, Agent, or Firm—Charles J. Brown

[57] ABSTRACT

An articulated support for an audio amplifier housing comprising a first arm pivotable from a retracted position in the housing to an angularly extended position and then translatable in and out with respect to the housing, and a second arm pivotable at one end from a retracted position in the first arm to an angularly extended position, with an adjustable speaker mount at the other end of the second arm allowing a speaker to be rotated and tilted.

11 Claims, 4 Drawing Sheets

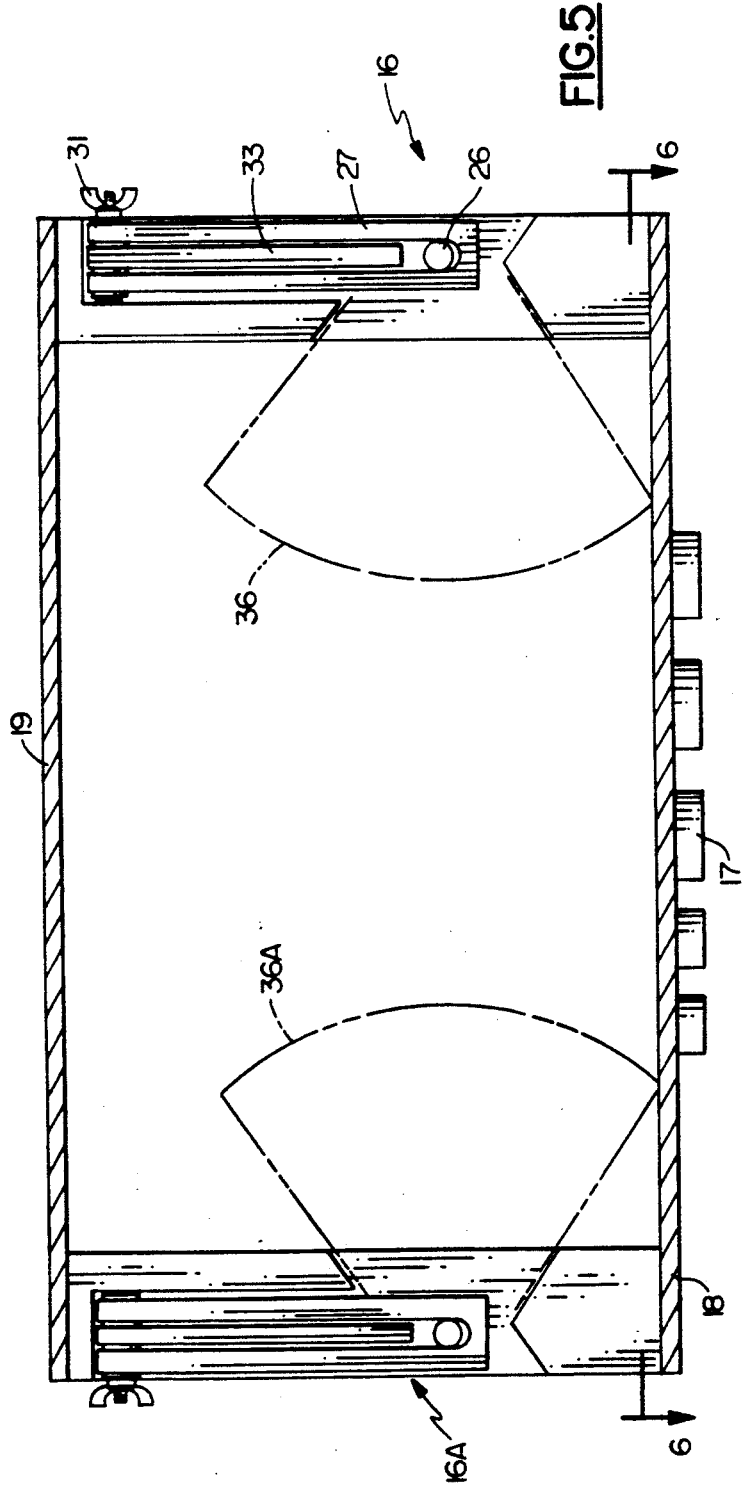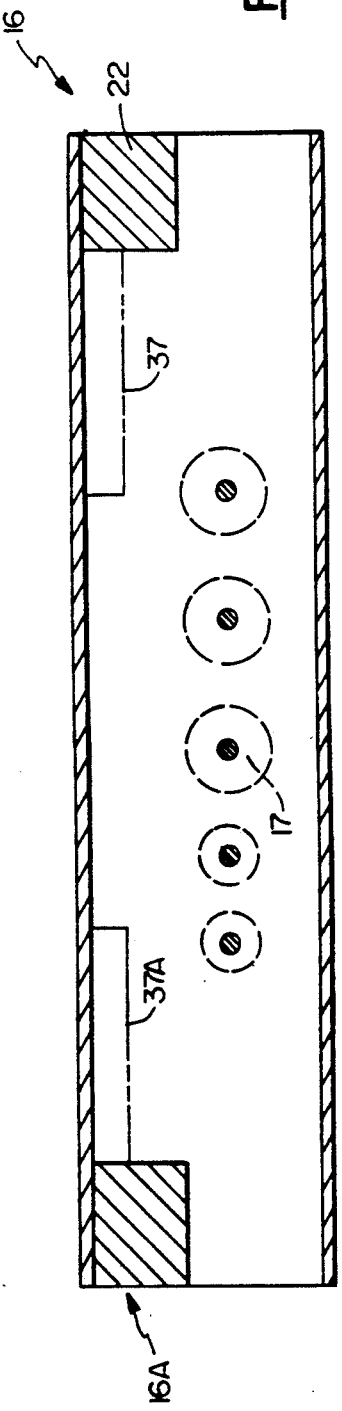

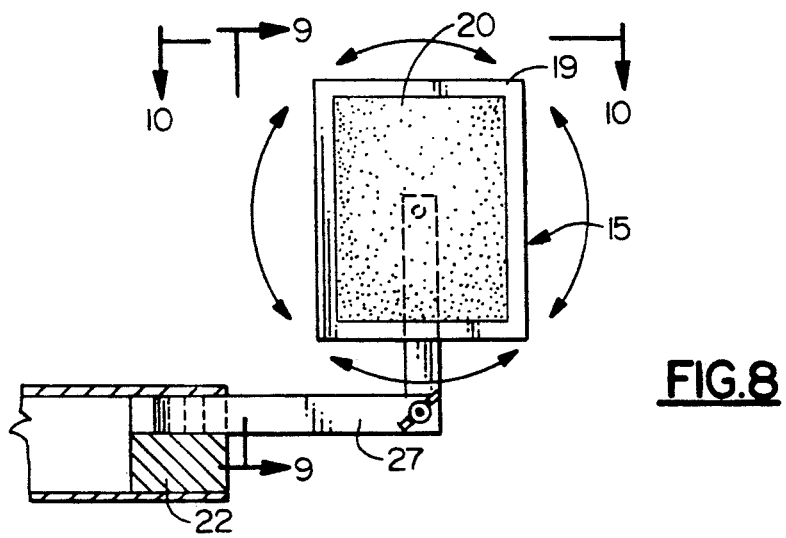
FIG.8
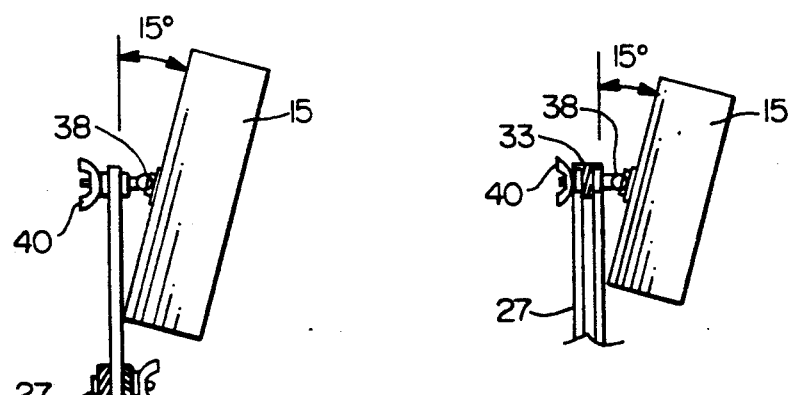
FIG.9A
FIG.10A
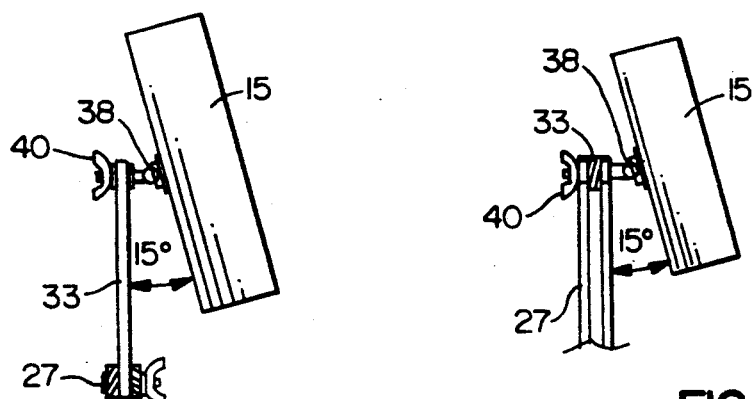
FIG.9B
FIG.10B

ARTICULATED SUPPORT ASSEMBLY

BACKGROUND OF THE INVENTION

Multimedia personal computers are available which include not only a monitor screen for visual displays but also speakers for an audio output which may be synchronized to the visual output. In an optimum configuration a pair of speakers are provided with one on each side of the monitor screen and mounted on supports so that their respective positions can be adjusted to give the best audio reception for an operator sitting before the monitor and keyboard of the computer.

The present invention has among its principal objects the provision of an articulated support assembly for such audio speakers which is retractable in a recess in the housing of one of the computer components such as an amplifier. The articulated support assembly must be capable of being extended outwardly from that retracted position by means of a plurality of folding arms, all of which can be slideably translated into and out of the housing frame to a selected position. These articulated arms should permit a speaker to be mounted at the end thereof and attached so that it can be rotated and tilted. The object is to incorporate the greatest number of degrees of freedom for infinitely variable selective positioning of the speaker and yet permit the entire support assembly to be retracted out of sight into the housing frame when not in use.

U.S. Pat. No. 3,680,396 discloses audio speakers which can be translated into and out of a recess in an associated frame but that single degree of freedom of adjustment is all the assembly provides. U.S. Pat. Nos. 3,976,162 and 4,601,361 show paired audio speakers which can be pivoted angularly but again that is the only degree of freedom of adjustment they provide. In a related field U.S. Pat. No. 5,082,235 teaches document holders for mounting on opposite sides of a computer monitor screen which are free to be tilted about two different axes but it affords no ability for translation in an in-and-out direction nor does it allow for retraction into any housing when not in use. U.S. Pat. No. 4,863,124 is unrelated to audio or computer equipment but is of interest in its disclosure of a pair of articulated supports which permit adjustment with at least three degrees of freedom, but none of them allows for in-and-out translation and the disclosure is silent on the concept of retraction into a housing.

SUMMARY OF THE INVENTION

An articulated support assembly is provided by the invention which comprises a frame and a post on the frame. A first arm is pivotable about the post in a first plane between a retracted position on the frame and a first angularly extended position. Slide means are included for translating the first arm longitudinally with respect to the post when the first arm is in its angularly extended position. A second arm is pivotable on the first arm in a second plane different from the first plane between a retracted position co-planar with the first arm and a second angularly extended position.

In a preferred form speaker mounting means are located at the end of the second arm remote from its pivotable connection to the first arm. The speaker mounting means may permit a mounted speaker to be rotated and tilted at any position in the rotation. The frame may be the housing of an audio amplifier. The slide means may comprise a longitudinal slot in the first arm into which the post extends. The second arm in its retracted position may be disposed within the slot and the slot may have a length sufficient to receive both the post and the retracted second arm, so that, when the second arm is retracted into the slot in the first arm, the first and second arms may be retracted together into the frame. The frame may be a housing defining an open recess and the first and second arms may be fully within that recess in their retracted position. In the preferred form of the invention two of these articulated support assemblies may be located on respective opposite sides of the frame.

BRIEF DESCRIPTION OF THE DRAWINGS

FIG. 5 is a horizontal section taken through an amplifier housing illustrating in plan the clearance required within for operation of the support assemblies;

FIG. 6 is a vertical section taken along the line 6—6 of FIG. 5 illustrating in elevation the clearance required within the amplifier housing for operation of the support assemblies;

FIG. 8 is an elevation showing a speaker mounted on the end of the second arm and illustrating its freedom of rotation thereon;

FIGS. 9A and 9B are elevations viewed along the line 9—9 of FIG. 8 showing the tilting of the speaker in a vertical plane; and FIGS. 10A and 10B are plan views along the line 10—10 of FIG. 8 showing the tilting of the speaker in a horizontal plane.

DESCRIPTION OF PREFERRED EMBODIMENT

Figure 1:
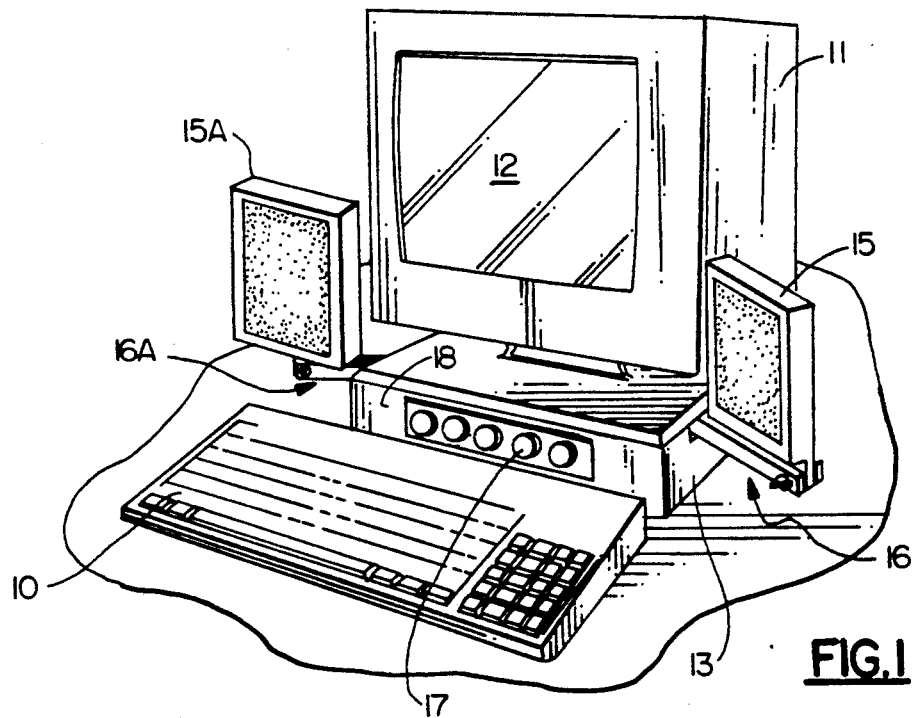
FIG. 1 is a perspective view of a multimedia personal computer equipped with a pair of the articulated support assemblies of the invention mounted on an amplifier housing.

Referring first to FIG. 1 a multimedia personal computer includes a keyboard 10 and a monitor 11 with a display screen 12 mounted on an amplifier 13 of an audio system. Similar right and left speakers 15 and 15A are detachably mounted on respective right and left articulated support assemblies 16 and 16A in accordance with the invention. As seen also in FIGS. 5 and 6 the amplifier 13 may include control knobs 17 on its front panel 18 and appropriate audio input and speaker output terminals (not visible) on its rear panel 19. The speakers 15 and 15A of course should have an output to match the capacity of the amplifier. As shown as well in FIGS. 8, 9A to B and 10A to B each speaker is within a steel enclosure 20 faced off with a grill 21 and may be surrounded by insulation packed within the enclosure.

Figure 2:
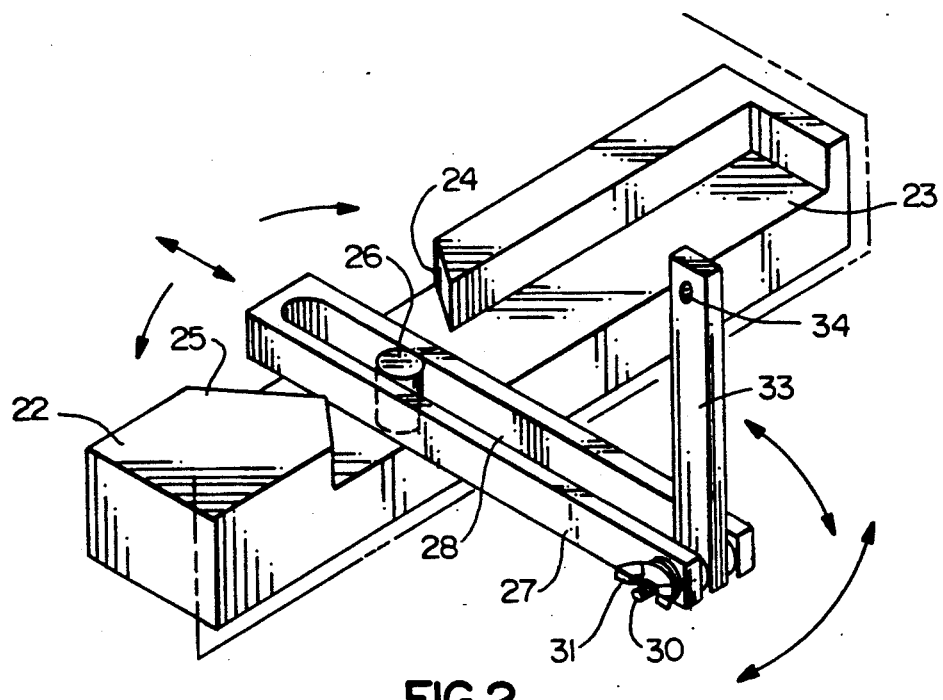
FIG. 2 is an enlarged perspective of one of the support assemblies of the invention showing the first and second arms in their extended positions.

In FIG. 2 the right support assembly 16 is shown in some detail. It includes a frame 22 which is inserted in and in effect becomes part of the housing of the amplifier 13. The frame defines an elongated recess 23 which opens not only outwardly but also inwardly into the amplifier housing at diverging walls 24 and 25. A post 26 extends upwardly on the frame from the floor of the recess 23.

A first arm 27 is formed with a longitudinal slot 28 throughout virtually its entire length. The post 26 extends upwardly into the slot 28 to allow the first arm 27 to be pivoted about the post 26 in a horizontal plane and also to allow the first arm 27 to be slideably translated with respect to the post into and out of the interior of the amplifier housing when the first arm 27 is in its angularly extended position outside the recess 23 as shown in FIG. 2. By a cross screw 30 having a wing nut 31, a second arm 33 is pivotable at one end on the first arm in a vertical plane. A hole 34 is located in the outer end of the second arm 33 to receive speaker mounting means described hereinafter. The slot 28 in the first arm 27 is of sufficient length to receive the post 26 and the full length of the second arm 33 so that the second arm 33 may be turned into a retracted position within the slot 28 coplanar with the first arm 28 and the two together may then be turned into the recess 23.

Figure 3:
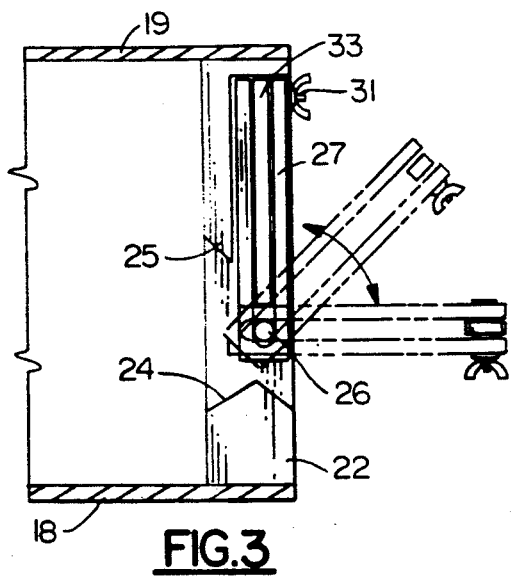
FIG. 3 is a plan view showing the first arm pivoted to its first extended position.
Figure 4A:
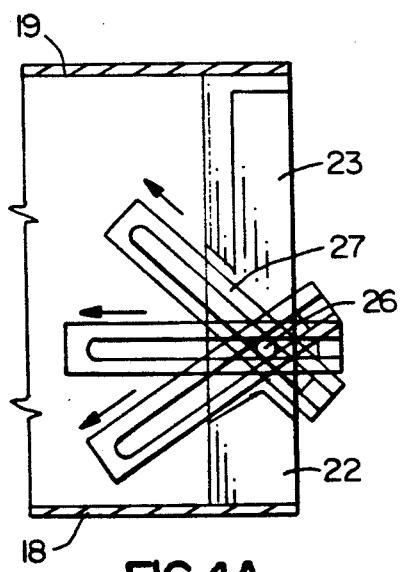
FIGS. 4A and 4B show various positions of the first arm pivoted and translated on the post within the frame.
Figure 4B:
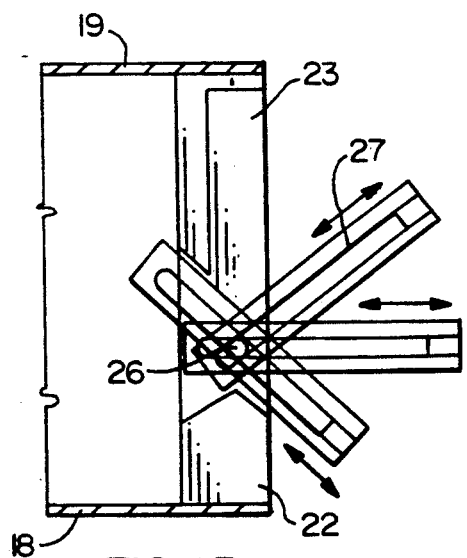

FIG. 3 shows the first and second arms 27 and 33 in solid lines in their retracted position within the recess 23 and in dot-dash lines in two other positions as they are turned in a horizontal plane to the fully extended position of the first arm 27. FIG. 4A shows the first arm 27 in three different selected positions of translation as it is translated longitudinally into the interior of the amplifier housing between the limits of the diverging walls 24 and 25 of the frame 22. FIG. 4B shows the first arm 27 translated outwardly in the other direction into three different selected positions outside the recess 23.

FIG. 5 illustrates by dot-dash lines 36 and 36A the clearance needed in a horizontal plane within the amplifier housing for positioning of each first arm such as the first arm 27. FIG. 6 illustrates by dot-dash lines 37 and 37A the similar clearance needed in a vertical plane within the amplifier housing.

Figure 7:
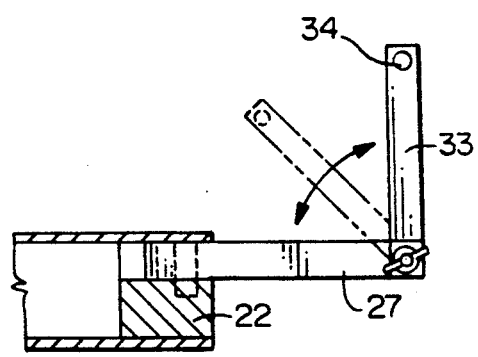
FIG. 7 is an elevation showing the second arm pivoted to its angularly extended position.

FIG. 7 shows the second arm 33 in its fully extended vertical position in solid lines and it shows one intermediate position of the second arm 33 in dot-dash lines as it is turned toward or away from its retracted position in the slot 28.

FIG. 8 shows the speaker 15 mounted at the end of the second arm 33. A ball and socket connector 38 secured to the rear of the speaker 15 is removably mounted in the hole 34 at the end of the second arm 33 by a wing nut 40. The connector 38 allows the speaker 15 to be tilted downwardly as shown in FIG. 9A or upwardly as shown in FIG. 9B, or inwardly towards the monitor 11 as shown in FIG. 10A or outwardly away from the monitor 11 as shown in FIG. 10B, all within limits of about fifteen degrees. The connector 38 also allows full 360° rotation of the speaker in a vertical plane as shown in FIG. 8. The ball and socket of the connector 38 are of a snug fit so that the speaker 15 holds any position which is selected.

The operation of the righthand support assembly 16 of the invention will now be described and it is to be understood that the operation of the left support assembly 16A is the same. The speaker 15 is not at first attached and the first and second arms 27 and 33 are in their retracted position shown in solid lines in FIG. 3. The first arm 27, with the second arm within its slot 28, is pivoted about the post 26 out of the recess 23 into a selected angularly extended position, as for example straight out to the right as shown in dot-dash lines in FIG. 3. The first arm 27 is then translated inwardly to one of the selected positions shown in FIGS. 4A or B within the clearance lines 36 and 37 within the housing of the amplifier 13 shown in FIGS. 5 and 6.

The second arm 33 is then pivoted about the screw 30 at the outer end of the first arm 27 to its angularly extended position, usually straight up as shown in solid lines in FIG. 7. The wing nut 31 is then tightened to hold the second arm in that selected position. Next the ball and socket connector 38 on the rear of the speaker 15 is mounted in the hole 34 and fixed in place by the wing nut 40. Finally the speaker 15 is rotated and tilted to the desired positions as shown in FIGS. 9A and B and 10A and B.

It will be understood that the articulated support assembly of the invention permits the speaker 15 to be located in a position which is selected on the basis of at least six infinitely variable degrees of freedom. The first is translation in-and-out of the first arm 27. The second is rotation in a horizontal plane by pivoting of the first arm 27. The third is rotation in a vertical plane by pivoting of the second arm 33. The fourth is tilting of the speaker 15 in a horizontal plane. The fifth is tilting of the speaker 15 in a vertical plane. And the sixth is rotation by rotating the speaker 15.

All of this is achieved by an articulated assembly which when not in use can be folded together and turned into the recess 23 within the frame 22 to be virtually out of sight.

The scope of the invention is to be determined by the following claims rather than the foregoing description of the preferred embodiment.

I claim:

1. An articulated support assembly comprising
   a) a frame,
   b) a post on said frame having a longitudinal axis,
   c) a first arm pivotable about said post in a first plane between a retracted position on said frame and a first angularly extended position,
   d) slide means for translating said first arm longitudinally with respect to said post when said first arm is in its angularly extended position, and
   e) a second arm pivotable on said first arm about an axis perpendicular to said post axis in a second plane different from said first plane between a retracted position coplanar with said first arm and a second angularly extended position.

2. An articulated support assembly according to claim 1 wherein speaker mounting means are located on the end of the second arm remote from its pivotable connection to the first arm.

3. An articulated support assembly according to claim 2 wherein the speaker mounting means permits a mounted speaker to be rotated and tilted.

4. An articulated support assembly according to claim 1 wherein the frame is part of the housing of an audio amplifier.

5. An articulated support assembly according to claim 1 wherein the slide means comprises a longitudinal slot in the first arm into which the post extends.

6. An articulated support assembly according to claim 1 wherein the frame is a housing defining an open recess and the first and second arms are fully within said recess in their retracted position.

7. An articulated support assembly according to claim 1 wherein two such assemblies are located on respective opposite sides of said frame.

8. An articulated support assembly comprising
   a) a housing frame defining an open recess,
   b) a post on said frame in the recess, c) a first arm pivotable about said post in a first plane between a retracted position in the recess in said frame and a selected first angularly extended position outside said recess, d) a longitudinal slot in said first arm into which the post extends providing means for slideably translating said first arm longitudinally with respect to said post when said first arm is in the first angularly extended position, and e) a second arm pivotable at one end on said first arm in a second plane perpendicular to said first plane from a retracted position in said slot in which it is coplanar with said first arm to a second angularly extended position, f) said slot having a length sufficient to receive both said post and said second arm in its retracted position, g) whereby when the second arm is retracted into the slot in the first arm the first and second arms may be retracted together into the recess in the housing frame.

9. An articulated support assembly comprising a) an audio amplifier housing frame defining an open recess, b) a vertical post on said frame in the recess, c) a first arm pivotable about said post in a horizontal plane between a retracted position in the recess and a selected first angularly extended position outside the recess, d) a longitudinal slot in said first arm into which the post extends providing means for slideably translating said first arm longitudinally with respect to said post when said first arm is in the first angularly extended position, e) a second arm pivotable at one end on said first arm in a vertical plane from a retracted position in said slot in which it is co-planar with said first arm to a second angularly extended position, f) said slot having a length sufficient to receive both said post and said second arm in its retracted position, g) speaker mounting means located on the end of the second arm remote from its pivotable connection with the first arm permitting a mounted speaker to be rotated and tilted at any position in that rotation, and h) whereby when the second arm is retracted into the second slot in the first arm the first and second arms may be retracted together into the recess in the housing frame.

10. An articulated support assembly according to claim 9 wherein two such assemblies are located on respective opposite sides of said amplifier housing frame.

11. An articulated support assembly comprising a) a frame, b) a post on said frame, c) a first arm pivotable about said post in a first plane between a retracted position on said frame and a first angularly extended position, d) a longitudinal slot in the first arm into which the post extends for translating said first arm longitudinally with respect to said post when said first arm is in its angularly extended position, and e) a second arm pivotable on said first arm in second plane different from said first plane between a retracted position coplanar with said first arm and a second angularly extended position, f) the second arm in its retracted position being disposed within the slot and the slot having a length sufficient to receive both said post and the retracted second arm, whereby when the second arm is retracted into the second slot in the first arm the first and second arms may be retracted together into the frame.

* * * * *